United States Patent
Pahuja et al.

(10) Patent No.: US 9,967,214 B2
(45) Date of Patent: May 8, 2018

(54) DIRECT CLIENT-TO-CLIENT INTERNET RELAY CHAT FOR SOFTAP CLIENTS

(71) Applicant: Qualcomm Innovation Center, Inc., San Diego, CA (US)

(72) Inventors: Mohit Pahuja, Roorkee (IN); Chaitanya Pratapa, Hyderabad (IN); Poonam Mishra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 15/063,410

(22) Filed: Mar. 7, 2016

(65) Prior Publication Data

US 2016/0344664 A1    Nov. 24, 2016

Related U.S. Application Data

(60) Provisional application No. 62/165,429, filed on May 22, 2015.

(51) Int. Cl.
| | |
|---|---|
| H04L 12/58 | (2006.01) |
| H04L 12/66 | (2006.01) |
| G06F 17/30 | (2006.01) |
| H04L 29/12 | (2006.01) |
| H04L 29/06 | (2006.01) |

(52) U.S. Cl.
CPC ........ *H04L 51/04* (2013.01); *G06F 17/30882* (2013.01); *H04L 12/66* (2013.01); *H04L 61/2514* (2013.01); *H04L 61/2546* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 6,857,006 | B1* | 2/2005 | Nishizawa | H04L 12/1827 709/203 |
| 7,441,043 | B1* | 10/2008 | Henry | H04L 29/1233 709/238 |
| 8,732,296 | B1* | 5/2014 | Thomas | H04L 63/1441 370/230 |
| 2003/0126213 | A1* | 7/2003 | Betzler | H04L 51/04 709/206 |
| 2004/0064512 | A1* | 4/2004 | Arora | H04L 51/04 709/206 |
| 2005/0136952 | A1* | 6/2005 | Zabawskyj | H04L 51/04 455/466 |

(Continued)

*Primary Examiner* — Thomas J Dailey
(74) *Attorney, Agent, or Firm* — Neugeboren ODowd PC

(57) ABSTRACT

Systems, methods, and apparatus are herein disclosed for enabling direct communication between two IRC clients without the use of an IRC server once the connection is established. In one instance this can involve a gateway electing to not mangle or not perform NAT on a private IP address of a sending client as a DCC request is passed to the IRC server. In another instance this can involve a gateway mangling or performing NAT on a sender public IP address of a DCC request after it has been passed to the IRC server and returned to the gateway. The clients can be SoftAP clients. The gateway can determine when to mangle and when not to mangle IP addresses using a database that include identifiers of IRC clients on a subnet along with respective IRC servers for those IRC clients.

20 Claims, 9 Drawing Sheets

(56) References Cited

U.S. PATENT DOCUMENTS

2009/0207843 A1* 8/2009 Andreasen .......... H04L 12/1403
370/392
2014/0269463 A1* 9/2014 Miryala ................ H04W 48/12
370/311

* cited by examiner

DIRECT CLIENT-TO-CLIENT INTERNET RELAY CHAT FOR SOFTAP CLIENTS

CROSS REFERENCE TO RELATED APPLICATIONS

The present application for patent claims priority to Provisional Application No. 62/165,429 entitled "DIRECT CLIENT-TO-CLIENT INTERNET RELAY CHAT FOR SOFTAP CLIENTS" filed May 22, 2015, and assigned to the assignee hereof and hereby expressly incorporated by reference herein.

BACKGROUND

Field

The present disclosure relates generally to direct communications between communication devices.

Background

The LINUX kernel is capable of supporting the direct client-to-client (DCC) communication protocol of Internet Relay Chat (IRC) as an alternative to other chatroom and instant message-type mediums. However, this feature is often not enabled on processors that are installed on many cellular phones today. Thus, the challenges of executing communication via the IRC are not well-understood.

For instance, once IRC is enabled on a LINUX-based processor, two clients accessing the Internet via the same gateway may want to carry out direct communication without the access point, using the DCC features of IRC. However, network address translation (NAT) in the gateway can modify IP addresses in data packets such that the clients are unable to establish a connection and thus can't implement direct IRC communication.

FIG. 1 illustrates a system 100 including two clients 102, 104, an IRC server 106, and a gateway 108 facilitating communication between the clients 102, 104 and the IRC server 106 via the Internet 110. Client 1 can initiate communication by requesting a DCC link to Client 2. This request is made to the gateway 108 with the inclusion of a private IP address for Client 1 (e.g., a private IP address and a private port address). Because this request has to be sent through the Internet to the IRC, a NAT component 112 of the gateway 108 mangles or changes the Private IP address associated with the outgoing request to a public IP address of the gateway 108.

The request is then sent from the gateway 108 to the IRC server 106, and the IRC server 106 responds by sending the request back to the public IP address of the gateway 108. The gateway 108 receives the request and knowing that the public IP address is a proxy for the private IP address Client 1, and knowing that the request was intended for Client 2, passes the request to Client 2 without mangling or changing the public IP address. Client 2 receives the request and attempts to establish a TCP connection with the sender of the request. To do this Client 2 responds to Client 1 with a SYN signal, believing that the requester is associated with the public IP address. When Client 2 receives the SYN signal and acknowledges with a SYN-ACK signal, this acknowledgement is associated with the private IP address of Client 1. Client 2 receives this acknowledgment, but is expected to receive an acknowledgment from the public IP address. Not recognizing the private IP address, Client 2 rejects the connection and the TCP connection fails.

Accordingly, there is a need for systems, methods, and apparatus that enable DCC communication between IRC clients.

SUMMARY

Aspects of the disclosure can be described as a gateway device in communication with first and second IRC clients, the first and second IRC client configured to communicate with each other via the IRC server and the gateway. The gateway device can include a database, a network address translation component (NAT component), an application programming interface (API), and a client matching module. The database can be configured to store nicknames of IRC clients on a subnet with identifiers of IRC servers that are connected to the IRC clients on the subnet. The API can be configured to control whether the NAT component performs NAT on IRC client communications that pass through the gateway device. The client matching module can have a database update module, a parser, an intended recipient identification module, an IRC server identification module, an IRC client match determination module, and a NAT control module. The database update module can be configured to record IRC client nicknames, IRC client nickname changes, and corresponding IRC server identities to the database. The parser can be configured to parse a direct client-to-client (DCC) request received at the gateway device from the first IRC client, and to form a parsed DCC request. The IRC server identification module can be in communication with the parser and can be configured to identify an IRC server identity associated with the first IRC client, and if the IRC server identification module determines that the IRC server identity is that of the IRC server, then an IRC client match determination module can be configured to determine if an entry for an IRC client in the database exists for the nickname and the IRC server identity, and if so, a NAT control module, in communication with the NAT component via the API, can be configured to disable the NAT component for the DCC request if the IRC client match determination module informs the NAT control module that an entry for an IRC client in the database exists for the nickname and the IRC server identity.

Other aspects of the disclosure can be described as a method comprising receiving at a gateway between two clients and an IRC server, a request from a first of the two clients for a direct communication with the second client, the request including an identifier of the intended recipient of the request, the two clients both connected to the IRC server through the gateway and both residing on the same subnet, the gateway also including a database of client identifiers for IRC clients on the subnet. The method can also include searching the database for the identifier of the intended recipient of the request and determining if the identifier matches an entry in the database. If so, the method can disable NAT component of the gateway for the request and transfer the request to the IRC server without changing a sender IP address in the request from a private IP address of the first client to a public IP address of the gateway.

Yet further aspects of the disclosure can be described as a system comprising a means for providing a gateway between two clients and an IRC server, the two clients being on the same subnet. The system can include a means for maintaining a list of client nicknames, their respective IRC servers, and their respective private IP addresses. The system can also include a means for receiving a request form a first of the two clients for a direct communication between the two clients, the request being received at the gateway. The system can further include a means for adding a client nickname and identify of the IRC server to the list for the first client in response to receiving the request. The system can also include means for changing a private IP address of the first client to a public IP address of the gateway and transferring the request to the IRC server. The system can yet further include a means for receiving the request back from the IRC server. The system can also include a means for checking to see if an IP address for the sender of the request is the public IP address of the gateway, and if so, analyzing the list of client nicknames and their respective IRC servers to determine if a nickname of the first client appears in the list along with the IRC server's identity, and if so, changing the public IP address of the gateway, in the request, back to the private IP address of the first client and transferring the request to the second client.

Further aspects of the disclosure can be described as a non-transitory, tangible computer readable storage medium, encoded with processor readable instructions to perform a method for establishing a direct communication between two IRC clients without using an IRC server once a connection is established. The method can include receiving at a gateway between two clients and an IRC server, a request from a first of the two clients for a direct communication with a second of the two clients, the request including an identifier of an intended recipient of the request, the two clients both connected to the IRC server through the gateway and both residing on the same subnet. The gateway can also include a database of client identifiers for IRC clients on the subnet. The method can include searching the database for the identifier of the intended recipient of the request. The method can also determine if the identifier of the intended recipient matches an entry in the database, and if so, disable a NAT component of the gateway for the request. The method can further transfer the request to the IRC server without changing a sender IP address in the request from a private IP address of the first client to a public IP address of the gateway.

DETAILED DESCRIPTION

Figure 1:
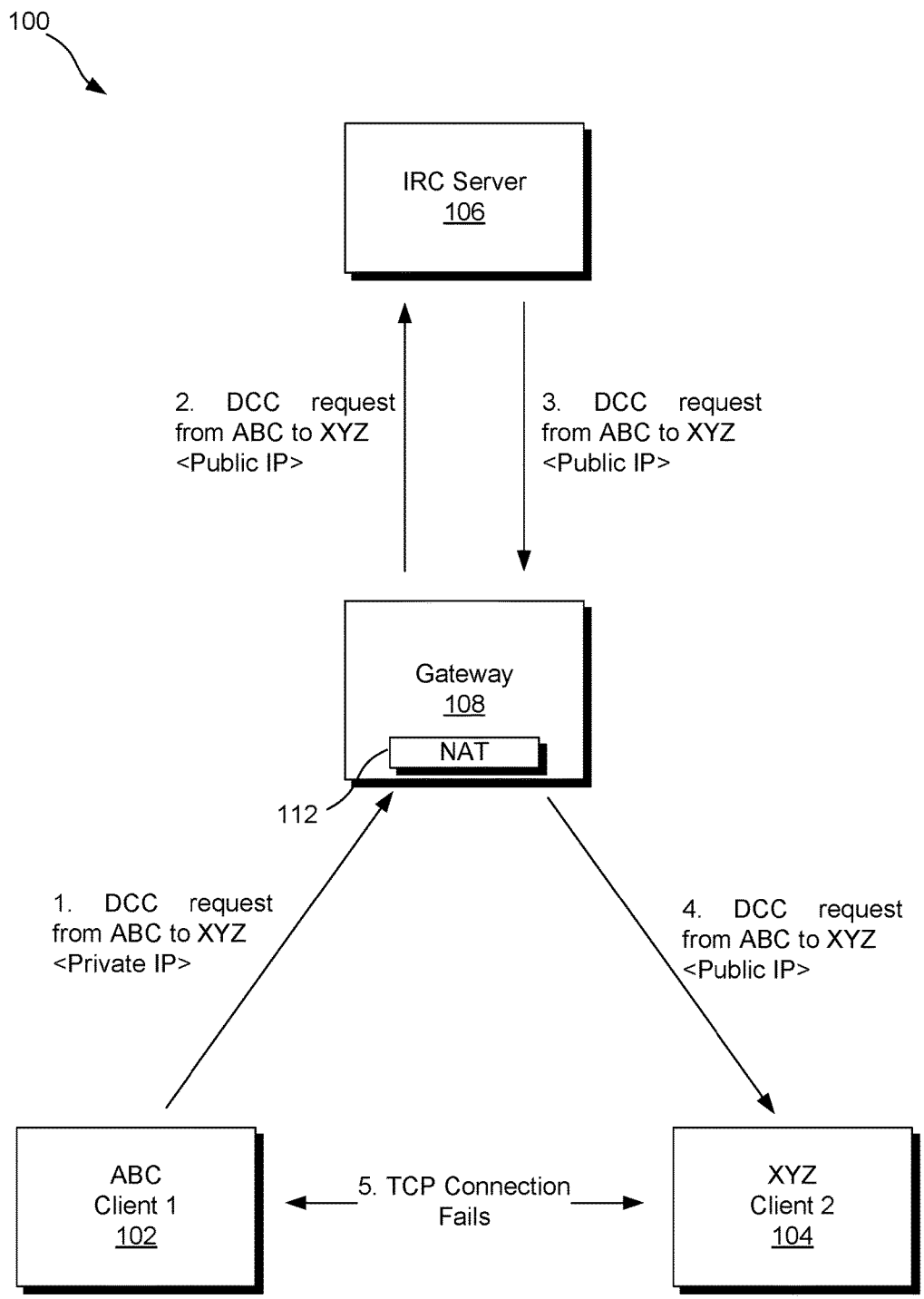
FIG. 1 illustrates a system including two clients an IRC server, and a gateway facilitating communication between the clients and the IRC server via the Internet.

The word "exemplary" is used herein to mean "serving as an example, instance, or illustration." Any embodiment described herein as "exemplary" is not necessarily to be construed as preferred or advantageous over other embodiments.

The term "internet relay chat" (IRC) is used herein to mean an application layer protocol that facilitates communication in the form of text. The chat process works on a client/server networking model. IRC clients are computer programs that a user can install on their system. These IRC clients communicate with chat servers (or "IRC servers") to transfer messages to other clients. IRC is mainly designed for group communication in discussion forums, called channels, but also allows one-on-one communication via private messages as well as chat and data transfer, including file sharing.

The term "data communication channel" (DCC) is used herein to mean the in-band data communication channel in SONET/SDH communication. Each SONET/SDH frame includes two Data Communication Channels (DCC) called Section DCC and Line DCC for transporting management messages between network elements, and between network elements and Management systems. DCC enables service providers' Operation Support Systems (OSS) to manage SONET/SDH network elements without the need for an expansive out-of-band data communication network.

The term "software enabled access point" (SoftAP) is user herein to mean a module enabling a computer which hasn't been specifically made to be a router into a wireless access point. SoftAP is often used interchangeably with the term "virtual router."

Data packets typically include a sender IP address and port number as well as a recipient IP address and port number. These IP addresses and port numbers can often be found in a header of a data packet. However, to simplify the following descriptions, the remainder of this disclosure will refer to the IP address and port number as the "IP address."

The term "gateway" is used herein to mean a device or multiple devices configured to interface between two networks using different protocols. For instance, the primary use of a gateway in this disclosure will be to interface a local network or subnet with the public Internet, since both networks typically operate via different network protocols. Additionally, the herein disclosed gateway also provides security for devices on the local network or subnet by mangling or changing IP addresses as data packets pass between the subnet and the Internet. In some instances, this mangling can take the form of network address translation (NAT) and be performed by a NAT component of the gateway. Data packets include IP addresses to identify a sender and recipient of the data packet. Usually these IP addresses are private IP addresses when a data packet is sent from a client on the subnet. To prevent malicious public access to devices on the subnet, the gateway mangles the private IP address of outgoing packets and changes them to a public IP address of the gateway. In this way, devices on the public Internet that receive these packets can only respond to the gateway rather than responding to (or directly accessing) the device on the subnet. This allows the gateway to confirm that incoming data packets are coming from known sources before transferring them on to the intended device on the subnet.

In this disclosure, the disclosed gateway has the ability to turn off mangling or NAT functionality for certain outgoing data packets (when certain conditions are met), or elect not to mangle or perform NAT on certain outgoing data packets.

Figure 2:
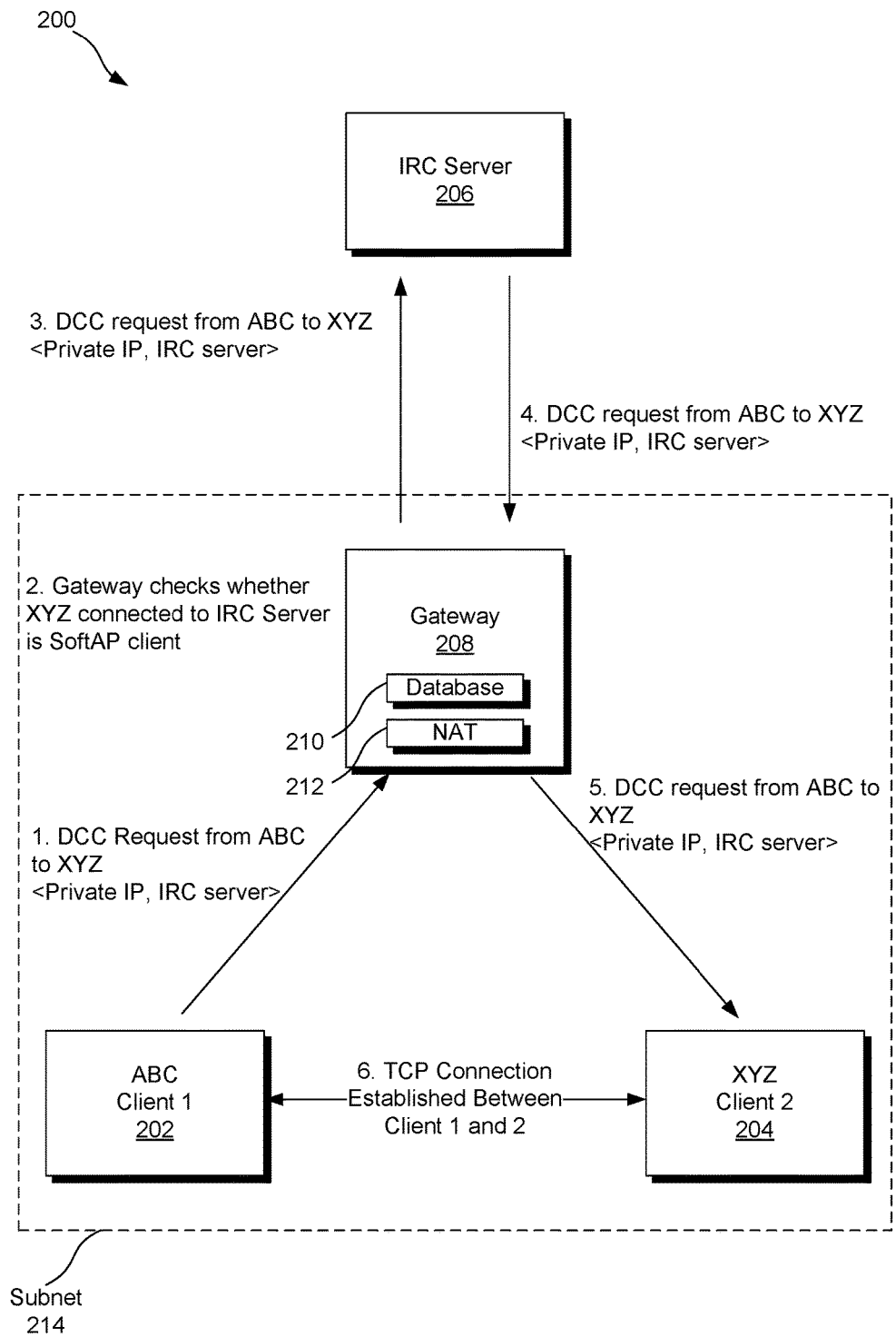
FIG. 2 illustrates a system in which the private IP address of Client 1 is not mangled nor changed by a NAT component in the gateway when a DCC request is passed from the gateway to the IRC server.
Figure 3:
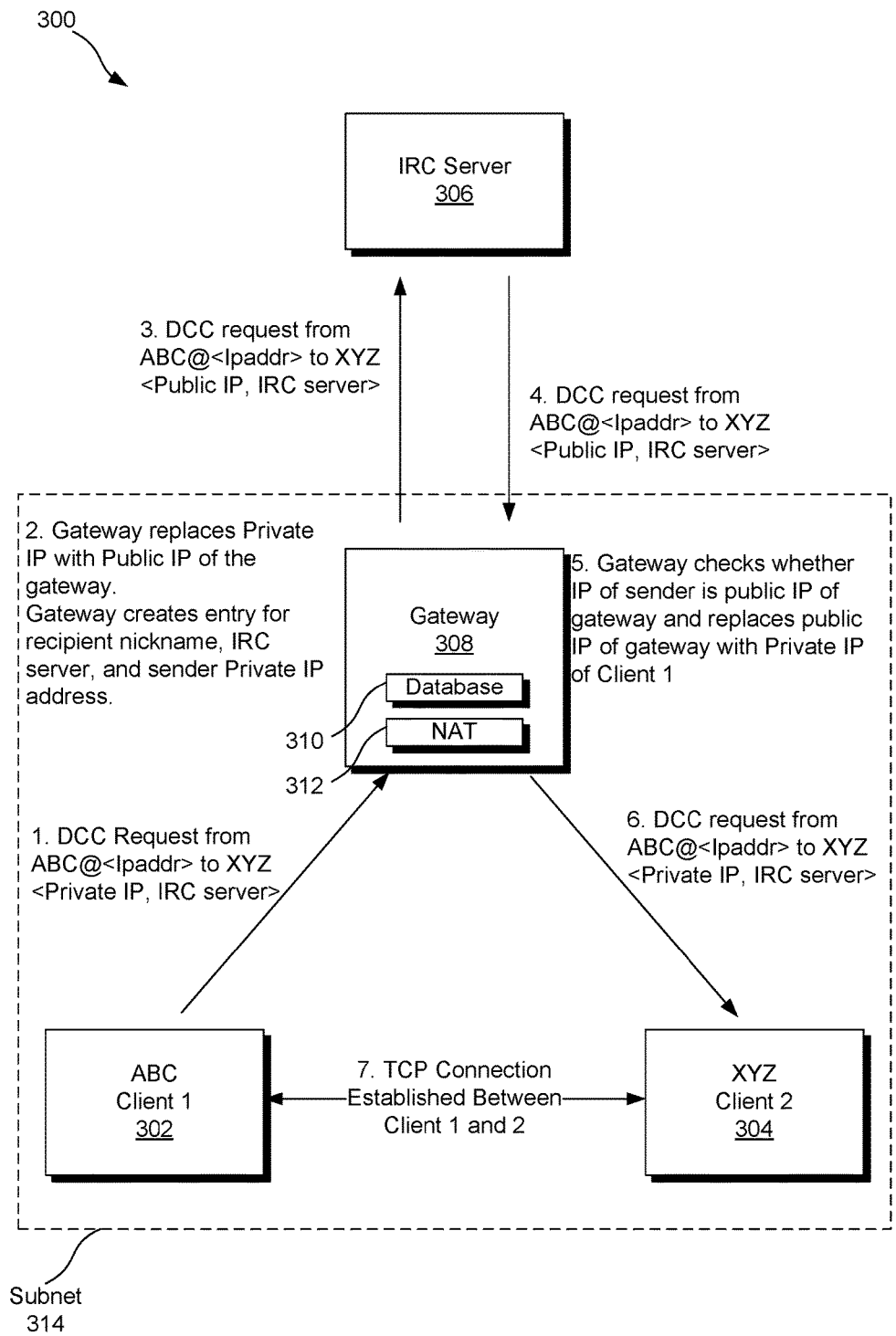
FIG. 3 illustrates a system in which the private IP address of Client 1 is mangled en route to the IRC server and then mangled again when the DCC request returns from the IRC server.

Disclosed herein are at least two approaches to enabling IRC communication between two IRC clients, where the IRC server is not needed once initial setup of the connection is complete. The first approach is illustrated in FIG. 2 and the second approach is illustrated in FIG. 3. Both methods can be implemented via a change to the Linux kernel of a gateway device that manages communication between IRC clients and IRC servers.

Method 1

FIG. 2 illustrates a system 200 in which the private IP address of Client 1 is not mangled nor changed by a NAT component 212 in the gateway 208 when a DCC request is passed from the gateway 208 to the IRC server 206. In other words, to ensure that a DCC connection between Client 1 and Client 2 can occur without use of the IRC server 206 once the connection is established, the gateway 208 disables the NAT component 212 for the outgoing DCC request, or elects to not perform NAT on the DCC request as it is passed to the IRC server 206. Thus, unlike FIG. 1, the gateway 208 passes the DCC request to the IRC server with the private IP not mangled. Now, when the IRC server 206 returns the DCC request to Client 2 204 through the gateway 208, Client 2 sees the sender IP address as the private IP address of Client 1 202 and the TCP connection can be established.

Both clients 202, 204 have nicknames, ABC (Client 1) and XYZ (Client 2), which the gateway 208 can use to determine when to mangle or not mangle IP addresses of incoming/outgoing data packets.

In greater detail, the system 200 operates as follows. Client 1 can make a DCC request during initial configuration of the DCC between Client 1 and Client 2. The request can pass to the gateway 208, the gateway 208 can then determine if the request is for communication between two clients on the same subnet 214 and connected to the same IRC server 206. For instance, the gateway 208 can maintain a database 210 with identifications of all clients on the subnet 214 and identifiers of the IRC servers that they are connected to. The database 210 can include nicknames and respective IRC servers for clients on the subnet 214. In other words, the database 210 can include a list, table, or matrix of <nickname, IRC> entries. Each DCC request can include an identifier for the intended recipient (e.g., a nickname). In the illustrated embodiment, the request is being sent to nickname=XYZ. The request also includes a value for the sender's private IP address and IRC server (i.e., identity of the IRC server).

When the gateway 208 receives the DCC request it can check the database 210 for entries that match the nickname of the intended recipient (XYZ in this illustration) and an identifier of the IRC server of the request. A match indicates that the intended recipient is another client on the same subnet using the same IRC server. Alternatively, the database 210 can only store entries for SoftAP clients, such that when a match is found, the gateway 208 can conclude that both the sender and recipient of the DCC request are SoftAP clients.

Either way, if the gateway 208 finds a match in the database 210 for the intended recipient (e.g., nickname=XYZ on IRC 206), then the gateway 208 can pass the request to the IRC server 206 without mangling the IP address (i.e., the data packets can be associated with the private IP address of Client 1 rather than being mangled to have a public IP address of the gateway 208). Said another way, the NAT component 212 can be disabled for Client 1 202 when sending a DCC request to another client on the same subnet 214 (e.g., through the IRC server 206 to Client 2 204). Typically, the gateway 208 mangles the private IP address of the sender when packets are sent external to the subnet 214 (i.e., to the Internet). To avoid mangling the private IP address in the request, the gateway 208 can turn the NAT component 212 off for this DCC request, or decide not to perform NAT on the request. This selective NAT operation can be enabled via modification to a kernel of the gateway's 208 operating system, for instance the Linux kernel that runs on the gateway 208. The IRC server 206 then returns the request to the gateway 208, again with the private IP address of Client 1, and then the gateway 208 forwards the request to Client 2.

Client 1 and 2 can now successfully establish the TCP connection since Client 2 associates the request with Client 1's private IP address and thus Client 2 will recognize an acknowledgement from Client 1, and the DCC connection is completed. In other words, by avoiding NAT mangling of Client 1's private IP address when the request is passed to the IRC server 206, the system 200 avoids the problem of Client 2 not recognizing an acknowledgement from Client 1 during a multi-part handshake with Client 1. In this way, a DCC connection can be formed between Clients 1 and 2 on the same subnet 214 (e.g., where both clients access the Internet via the same gateway 208) and further communication between the clients 202, 204 can be performed without the IRC server 206.

The NAT component 212 can be configured to mangle or change private IP addresses associated with an outgoing packet to a public IP address of the gateway 208. However, as implemented in system 200, the NAT component 212 is disabled for the outgoing DCC request from Client 1 where the recipient's nickname and corresponding IRC server are matched to entries in the gateway's 208 database 210. The NAT component 212 can also be configured to determine what client on the subnet 214 to send an incoming packet to when that packet is received from outside the subnet 214 and is addressed to the public IP address of the gateway 208.

To determine if an outgoing packet is destined for another client on the same subnet 214 via a common IRC server 206, the gateway 208 can maintain a list, matrix, or table of clients and IRC servers and connections therebetween. This list, matrix, or table can be stored in database 210. For instance, the gateway 208 can maintain a database of identifiers for each client, where each identifier includes a client nickname and respective IRC server. Said another way, the database 210 can include a set of identifiers <nickname; IRC server>. These nicknames are typically used to connect to the IRC server 206 and are unique for all clients connected to a given IRC server. In an embodiment, this database 210 can include identifiers (e.g., <nickname, IRC server>) for all clients connected to an IRC server via SoftAP. Unique nicknames are assigned to all clients connected to a given IRC server such that no two clients connected to the same IRC server have the same nickname.

Where the clients 202, 204 are SoftAP clients, the system 200 can be described as follows: the private IP address of a first SoftAP client 202 is not mangled in the DCC request during initial configuration if the packet is destined for another SoftAP client (e.g., second SoftAP client 204) on the same subnet 214. As a result, the second SoftAP client 204 initiates a TCP connection with the private IP address of the first SoftAP client 202 and receives a reply from the same private IP address (i.e., the first SoftAP client 202). Because the second SoftAP client 304 recognizes the IP address from which the reply came from, the connection will be successful.

In an embodiment, establishing the TCP connection can be via a three-way handshake. For instance, the second SoftAP client 204 can send a SYN packet to the IP address associated with the sender of the DCC request (e.g., the private IP address of the first SoftAP client 202). This SYN packet passes through the gateway 208 and is passed to the first SoftAP client 202 without being passed to the IRC server 206. The first SoftAP client 202 receives the SYN packet and responds with a SYN-ACK packet (or other acknowledgement). The second SoftAP client 204 receives the SYN-ACK packet and recognizes the private IP address associated with the packet. Because the source of the SYN-ACK packet is recognized, the second SoftAP client 204 can establish the connection. Other than a three-way handshake can also be employed.

In an embodiment, both clients 202, 204 can each include a TCP server. The TCP connections are formed using the TCP protocol.

Method 2

FIG. 3 illustrates a system 300 in which the private IP address of Client 1 is mangled en route to the IRC server and then mangled again when the DCC request returns from the IRC server. In other words, to ensure that a DCC connection between Client 1 302 and Client 2 304 can occur without use of the IRC server 306 once the connection is established, the gateway 308 enables a NAT component 312 for the incoming DCC request, or elects to perform NAT on the DCC request as it is passed to the IRC server 206. Thus, like FIG. 1, the gateway 308 mangles the private IP address of Client 1 302 in the DCC request as the request is passed to the IRC server, but unlike the system 100 of FIG. 1, the gateway 308 again mangles the DCC request as it reaches the gateway 308 from the IRC server 306, such that a private IP address of Client 1 302 is associated with the DCC request when it reaches Client 2 304. Both clients 302, 304 have nicknames, ABC (Client 1) and XYZ (Client 2), which the gateway 308 can use to determine when to mangle or not mangle IP addresses of incoming/outgoing data packets.

FIG. 3 in detail starts with Client 1 302 again sending a DCC request to Client 2 304 through a gateway 308 and an IRC server 306. Here, the gateway 308 mangles the private IP address of Client 1 302 as the DCC request passes to the IRC server 306, and ads an entry in a list, matrix, or table of a database 310 of the gateway 308, identifying Client 1 302 (e.g., each entry can include a client nickname, IRC server, and private IP address). In some embodiments, the database 310 only includes entries for SoftAP clients. When the DCC request is passed from the IRC server 306 to Client 2 304 back through the gateway 308, the gateway 308 parses the request into a parsed DCC request and checks to determine whether the packet was sent from another client on a same subnet 314 and that the sending client is using the same IRC server 306 as Client 2 304 (the intended recipient of the DCC request). For instance, the gateway 308 can check the sender IP address of the packet to see if the sender IP address matches the public IP address of the gateway 308. If so, then the gateway 308 performed NAT on the packet at some prior time, and thus can search the database 310 to find a match for the DCC request. The gateway 308 will include an entry for the DCC request from Client 1 that was discussed above, and thus can recognize that it previously performed NAT on the DCC request and link the request to Client 1 and its private IP address. The NAT component 312 can then mangle the sender IP address of the DCC request, changing it from the public IP address of the gateway 308 back to the private IP address of Client 1 302. This mangling is sometimes referred to as "reverse NATing." The clients 302, 304 can then complete configuration of a TCP connection and begin communicating without the IRC server 306.

Both clients 302, 304 have nicknames, ABC (Client 1) and XYZ (Client 2), which the gateway 308 can use to determine when to mangle or not mangle IP addresses of incoming/outgoing data packets.

The primary points of differentiation for the system 300 are when the DCC request passes out through the gateway 308 and when the request returns through the gateway 308. When leaving the subnet 314, the DCC request includes a nickname of the intended recipient client (e.g., XYZ for Client 2 302), the IRC server 306, and a private IP address of Client 1 302. The gateway 308 stores an entry for this data in a database 310. Additionally, the NAT component 312 of the gateway 308 mangles the sender private IP address of the DCC request changing it from the private IP address of Client 1 302 to the public IP address of the gateway 308.

In an embodiment, both clients 302, 304 can each include a TCP server.

Figure 4:
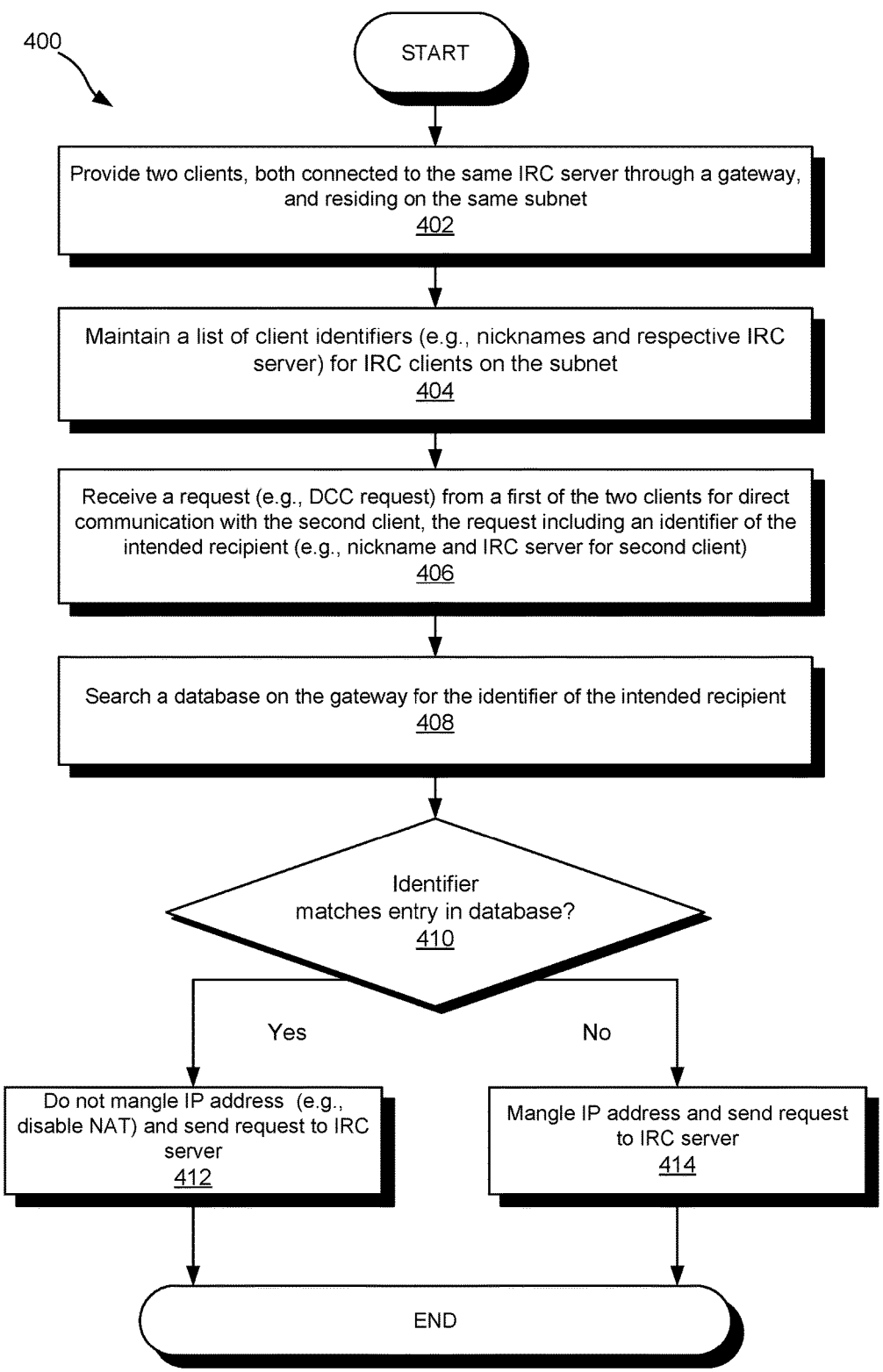
FIG. 4 illustrates an embodiment of a method for implementing the system.

FIG. 4 illustrates an embodiment of a method 400 for implementing the system 200. The method 400 can include provides two clients (e.g., SoftAP clients), both connected to the same IRC server through a gateway, and both residing on the same subnet (Block 402). The method 400 can maintain a list of client identifiers (e.g., client nicknames and respective IRC servers) for IRC clients on the subnet (Block 404). This list can also be a table or matrix and can be stored in a database of the gateway. The method 400 can also receive a request (e.g., a DCC request) from a first of the two clients for direct communication with the second client, the request including an identifier of the intended recipient (e.g., recipient nickname and IRC server) (Block 406). The method 400 can further include searching a database of the gateway for the identifier of the intended recipient. The method 400 can then determine if the identifier matches an entry in the database (Decision 410). If not, then the method mangles the sender IP address in the request and sends the packet to the IRC server (Block 414). If a match is found, then the sender IP address is not mangled (e.g., the NAT component or functionality of the gateway is turned off or not implemented for this DCC request) (Block 412). While this is the end of the illustrated portions of method 400, one of skill in the art will recognize that the request will go out to the IRC server, return through the gateway to the second client without mangling of the IP address, and thus the TCP connection between the clients can be established since the second client will be working with the private IP address of the first client.

Figure 5:
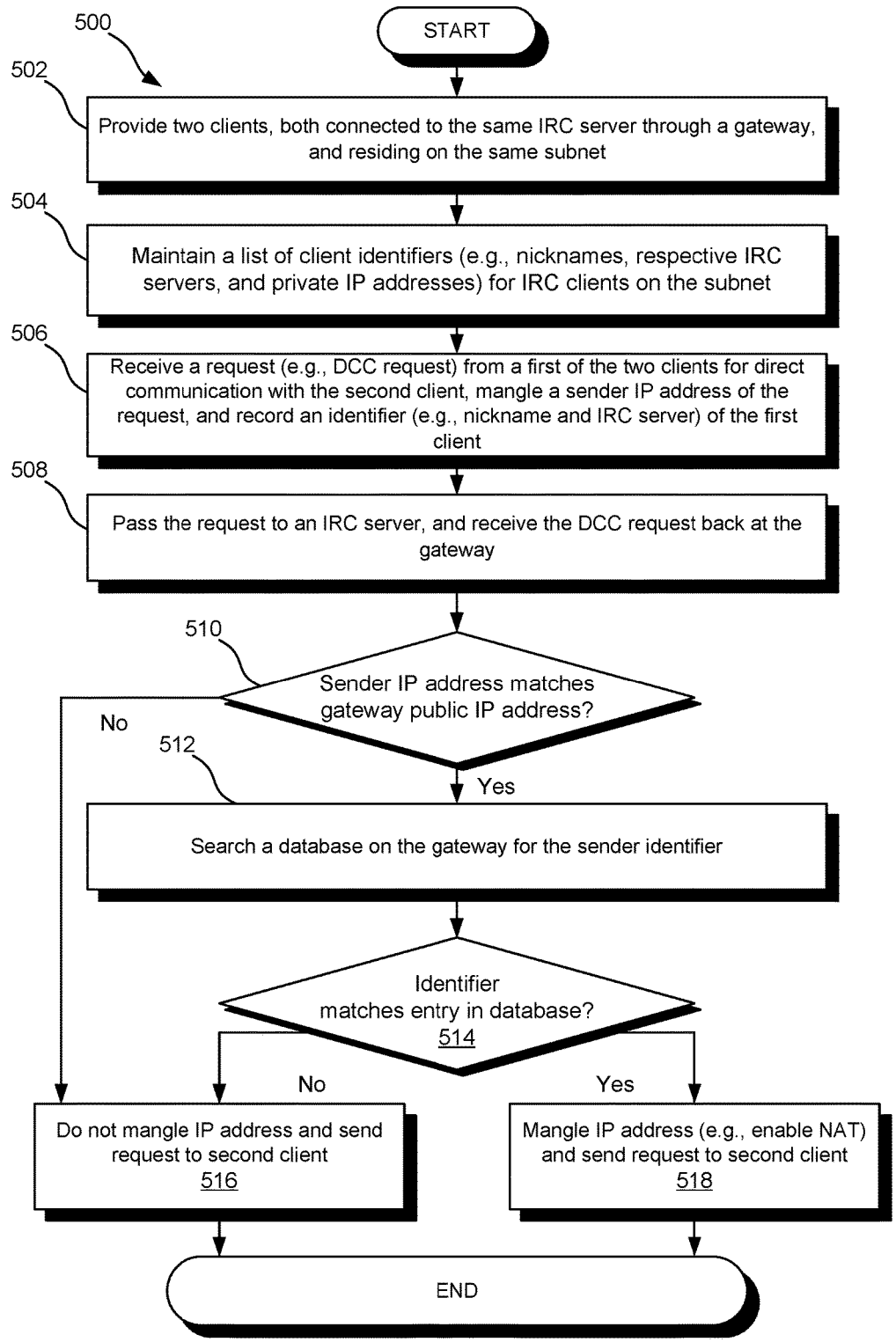
FIG. 5 illustrates an embodiment of a method for implementing the system.

FIG. 5 illustrates an embodiment of a method 500 for implementing the system 300. The method 500 provides two clients (e.g., SoftAP clients), both connected to the same IRC server through a gateway, and both residing on the same subnet (Block 502). The method 500 can maintain a list of client identifiers (e.g., client nicknames, respective IRC servers, and corresponding private IP addresses) for IRC clients on the subnet (Block 504). The method 500 can also receive a request (e.g., a DCC request) from a first of the two clients for direct communication with the second client. The gateway can mangle the sender's private IP address, changing it to a public IP address of the gateway, and send the DCC request with mangled sender IP address to the IRC server (Block 506). The gateway can also record an identifier for the first client, for instance, a nickname of the sender and a respective IRC server (Block 506). The method 500 can then pass the request to a respective IRC server and receive the DCC request back at the gateway (Block 508). The gateway can then determine if the sender IP address matches a public IP address of the gateway (Decision 510), which would indicate that the gateway had performed NAT on an outgoing version of the DCC request. If no match, then the gateway does not mangle the sender IP address of the request and passed the request to the second client (Decision 514). If there is a match to the gateway's public IP address, then the method 500 searches a database of the gateway for an entry matching an identifier of the sender (Block 512). If a matching entry is not found (Decision 514), then the gateway does not mangle the sender IP address and passes the request to the second client (Block 516). If a match is found (Decision 514), then the gateway mangles the sender IP address (e.g., enabling a NAT component of the gateway for this DCC request) and sends the request to the second client (Block 518). The clients can then establish a TCP connection since Client 2 will be able to recognize an acknowledgement from Client 1 during a TCP handshake (a part of the TCP protocol).

Figure 6:
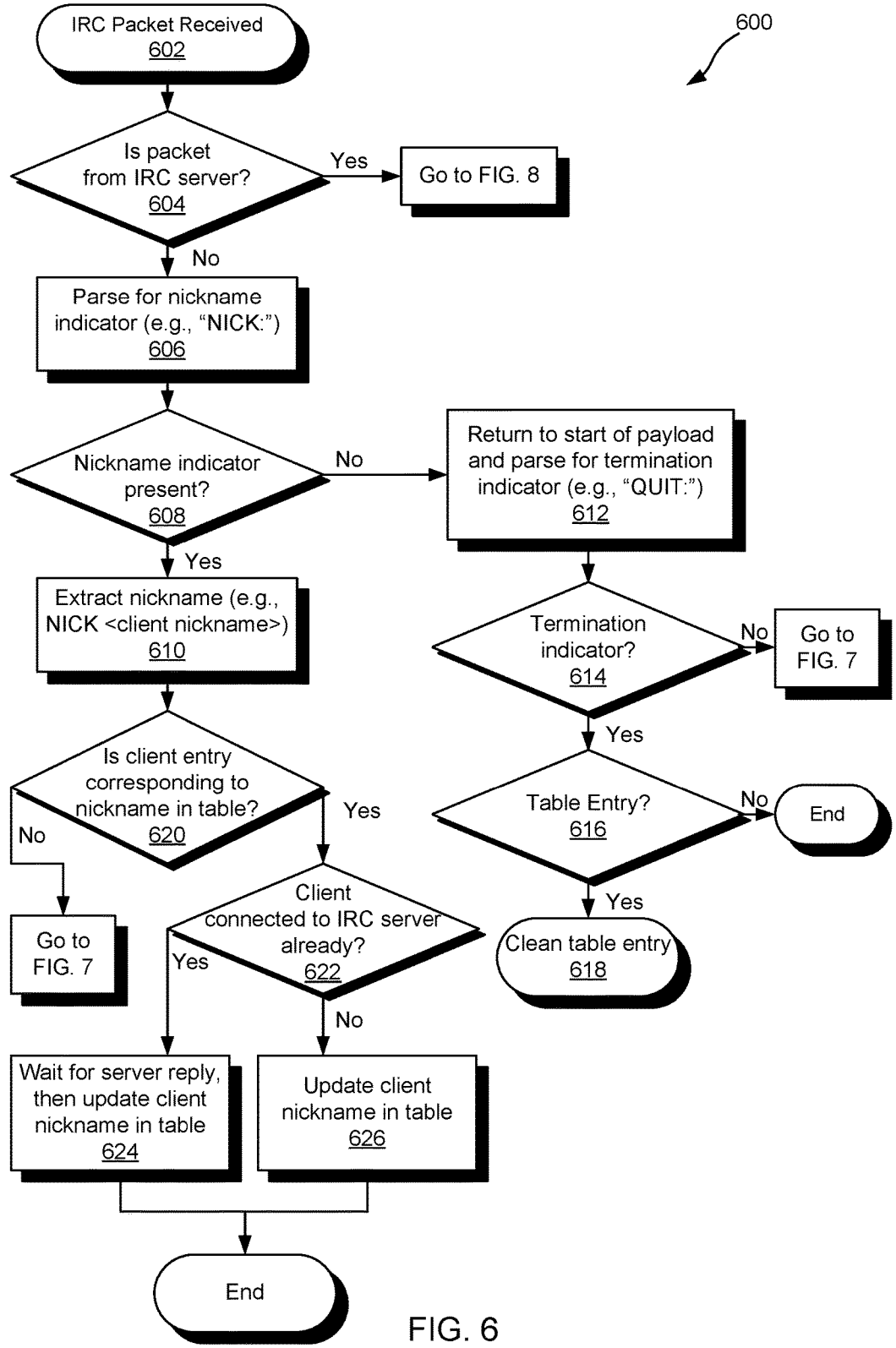
FIG. 6 illustrates an embodiment of another method for implementing the systems herein disclosed.
Figure 7:
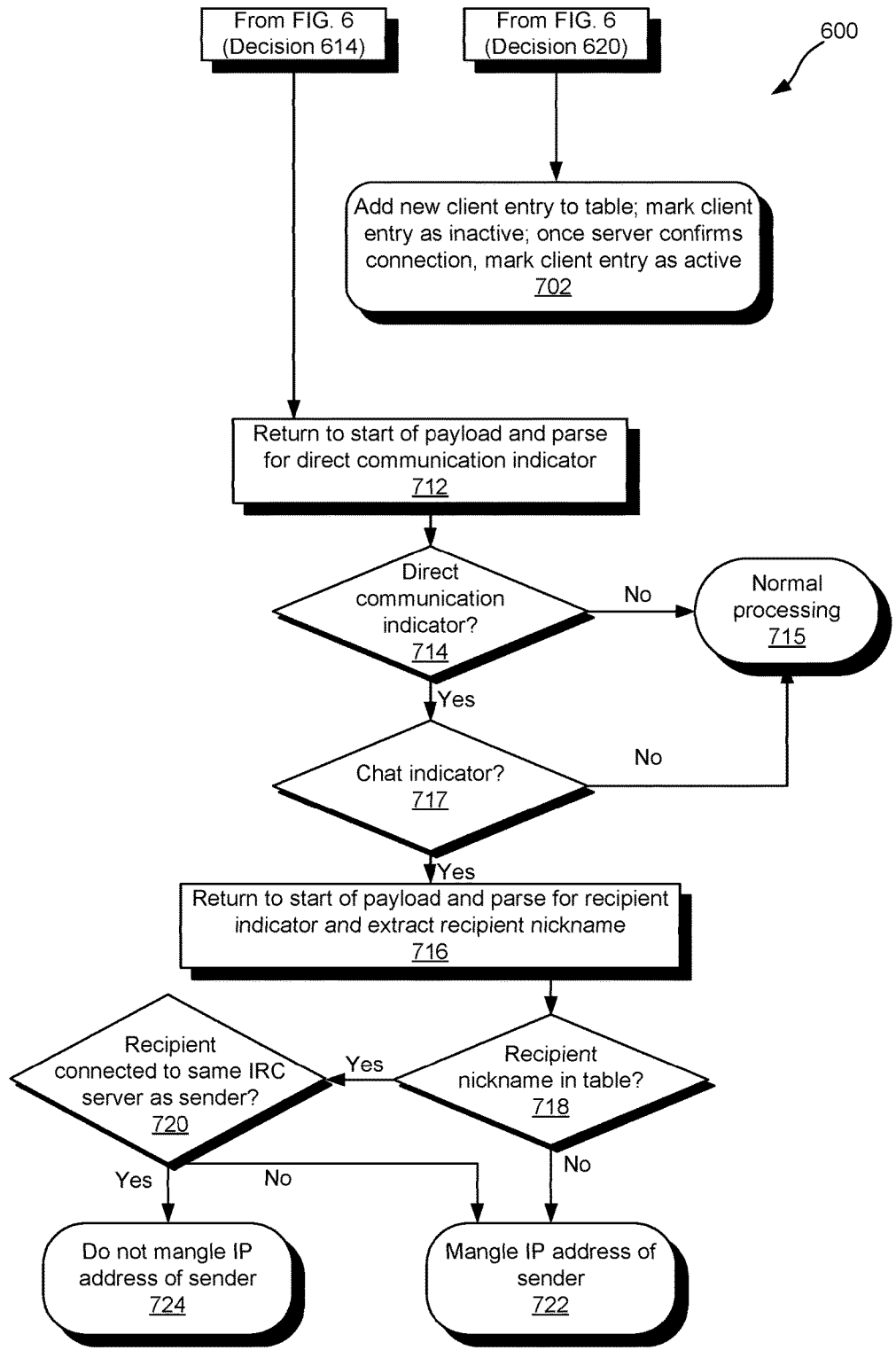
FIG. 7 illustrates further details of the embodiment shown in FIG. 6.
Figure 8:
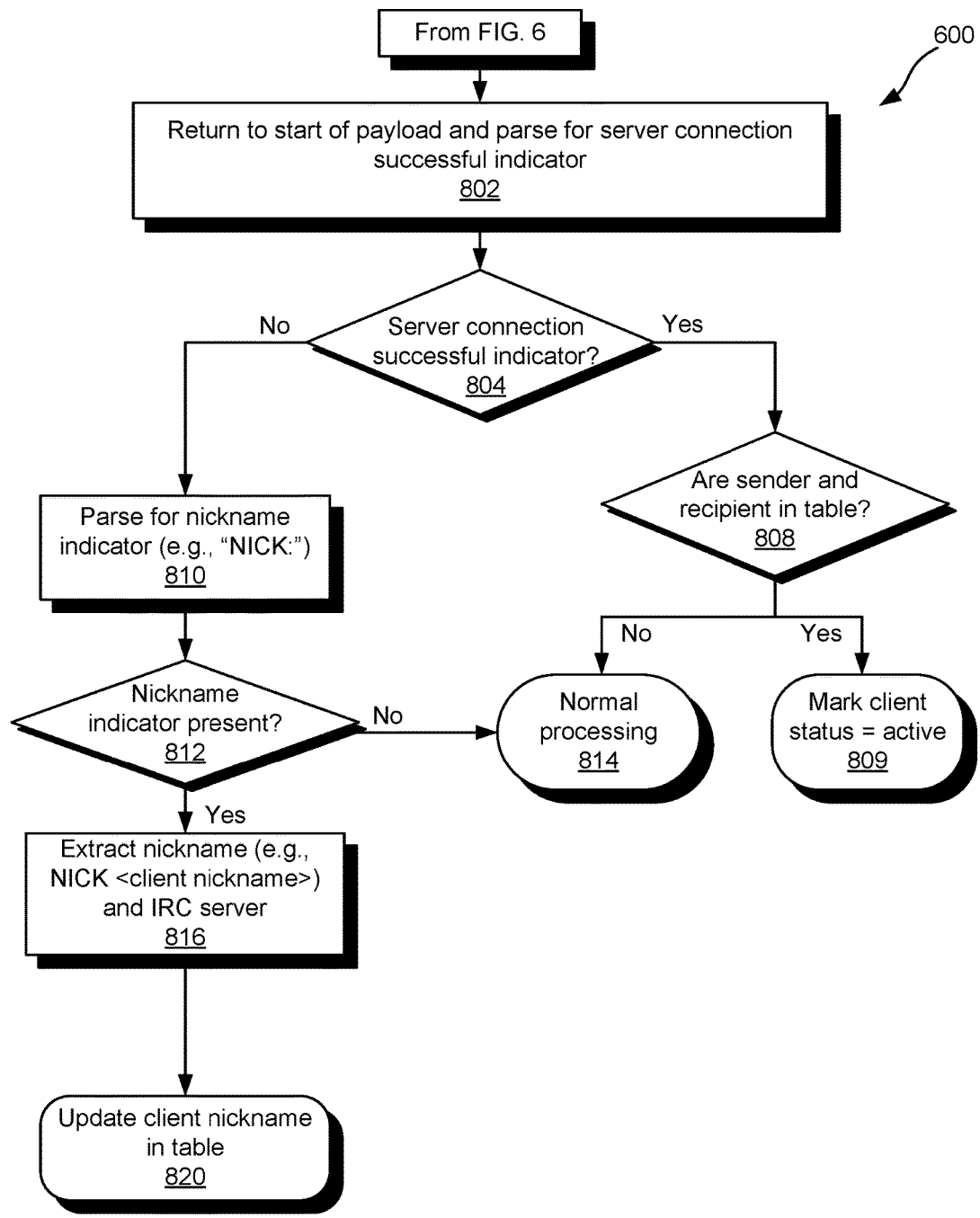
FIG. 8 illustrates further details of the embodiment shown in FIGS. 6 and 7.

A more detailed illustration of the methods referenced relative to FIGS. 2-5 is given in FIGS. 6-8.

FIG. 6 illustrates a method of handling IRC packets intended for direct chat mechanism communications between two IRC clients in communication with the same IRC server. The method 600 can identify a nickname portion of an IRC packet. Often, the structure "NICK: nickname" is used to identify the nickname in the IRC packet. The gateway can first identify IRC packets at the kernel level in parallel to parsing of the IRC packet. Where a sending client is first requesting a connection with another client, the client will ask for use of a particular nickname. The gateway cannot assume that the IRC server will accept the nickname, because the IRC server may reply that the nickname is not available (e.g., already in use). Once the IRC server responds with an acceptance of the new nickname and the connection, the gateway can mark the client state as active in a corresponding entry in a table of the gateway. An active client is connected to the IRC server, while an inactive client is not, or is not yet, connected to the IRC server. If the IRC server does not accept a nickname, then the client again tries to make the connection, but using a different nickname. The gateway can again record the new nickname, and mark the status as inactive until the IRC server accepts the nickname (i.e., accepts the connection).

More specifically, the method 600 starts with receipt of an IRC packet at a gateway (e.g., 208, 308) (Block 602). The gateway can determine if the IRC packet came from an IRC server (Decision 604). If it did, then the method 600 continues as illustrated in FIG. 8 (discussed below). If the IRC packet did not come from an IRC server, then it came from an IRC client (e.g., 202, 302), and the gateway parses the IRC packet for a nickname indicator (Block 606) (e.g, "NICK" or "NICK:"). If a nickname indicator cannot be found (Decision 608), then the gateway returns to a start of the payload and parses for a termination indicator (Block 612). If a termination indicator is not found (Decision 614), then the method 600 continues as illustrated in FIG. 7 (discussed below). A termination indicator evidences that the IRC client is requesting termination of the connection with the IRC server. If the termination indicator is found (Decision 614), then the gateway deduces that the sender client is trying to terminate the connection, so the gateway needs to clean a table of the gateway of any entries for the sender client. If such an entry exists in the table of the gateway (Decision 616), then the gateway cleans or erases the table entry for the sender client and the method 600 ends. If no entry exists, then the method 600 ends.

Returning to decision 608, if the nickname indicator is present, then the IRC packet includes a nickname of the sender client, and so the gateway extracts the nickname from the payload (Block 610). The nickname can often be found adjacent to the nickname indicator (e.g., "NICK <sender client nickname>"). In some cases a space will separate the nickname indicator and the nickname. In other cases, a colon followed by a space will separate them. For IRC packets, the IRC protocol requires a nickname, and thus all IRC packets will have a nickname indicator. Given the nickname, the gateway determines if a client entry exists in the table corresponding to the nickname (Decision 620). This can be checked by looking for a nickname and IRC server IP combination in the client table since this combination uniquely identifies the sending client since no two clients can have the same nickname when connected to the same IRC server. Further, if a client uses same nickname to connect to two different IRC servers, then the IRC server IP will be different.

If the nickname does not correspond to a client entry in the table (Decision 620), then the method 600 continues as illustrated in FIG. 7 (discussed below). If a corresponding client entry does exist, then the gateway determines if the client is connected to an IRC server (Decision 622). In other words, the gateway determines if the sending client is an active client. If so, then an active client, or one that already has a connection with the IRC server, is trying to change its nickname. For this to happen the IRC server needs to allow the nickname change, so the gateway waits for a reply from the IRC server indicating that the requested nickname change is acceptable (Block 624). Once the gateway receives the replay from the IRC server, the gateway can update the sending client nickname in the table (Block 624). If the client is not already connected to the IRC server (i.e., is not an active client), this means that an inactive client is trying to change its nickname. This may happen where the IRC server does not accept a requested nickname used during connection initialization, to name one non-limiting example. Where the sending client is inactive, the gateway updates the nickname of the sending client in the table (Block 626).

Turning to FIG. 7, the method 600 can pick up from where Decision 614 and 620 left off in FIG. 6. If coming from Decision 620, then the IRC packet has a nickname, but it is not one corresponding to an entry in the table. If coming from Decision 614, then the packet does not have a nickname. Either way, a new sender client is trying to establish a connection with the IRC server, so the gateway adds a new client entry to the table, marks the client as inactive, and once the IRC server confirms the connection with this sender client, the gateway marks the client entry as active (Block 702). The newly added client entry can include a client IP, IRC server IP, and sender client nickname. Since a packet can either include a nickname or DCC information, Block 702 is an end of the line for the method 600 since no further parsing is required.

Coming from Decision 614 (i.e., the packet does not have a nickname), then the gateway can return to a start of the payload and parse for a direct communication indicator (Block 712). If the direct communication indicator is not identified in the IRC packet (Decision 714), then the IRC packet is sent on for regular processing in the gateway (Block 715). If the direct communication indicator is found (Decision 714), then the a receiving client nickname should appear in the payload, so the gateway can return to a start of the payload and parse for a recipient indicator and extract a recipient nickname (Block 716). Given this recipient nickname the gateway can determine if the recipient nickname corresponds to an entry in the table (Decision 718). If the gateway cannot find a corresponding entry in the table, then the receiving client is not connected to the IRC server through the same gateway as the sending client. In this case the gateway can mangle the sender IP address in the packet (Block 722). If the gateway finds a corresponding entry in the table (Decision 718), then it can next check to see if the receiving client is connected to the same IRC server as the sender (Decision 720). If not, then the receiving client is not connected to the IRC server through the same gateway as the sending client, and the gateway can pass the packet for mangling of the sender IP address in the packet (Block 722). However, if the gateway finds that the recipient client is connected to the same IRC server as the sender client, then the gateway does not mangle the sender IP address in the packet (Block 724).

Turning to FIG. 8, recall that this portion of the method 600 emanates from situations where an IRC packet is received (Block 602) from an IRC server (Decision 604) rather than from an IRC client, or sending client. In this case, the gateway can return to a start of the payload of the IRC packet and parse for a server connection successful indicator (Block 802). If a server connection successful indicator is found (Decision 804), then the gateway determines if entries corresponding to the sender client and the recipient client can be found in the table (Decision 808). If yes, then the IRC server has accepted the connection, and the gateway can mark the client status as active in the table (Block 809). If corresponding entries are not found, then the gateway can process the IRC packet per regular methods (Block 814).

Returning to the Decision 804 regarding whether the server connection successful indicator is present, if not, then the gateway can return to a start of the IRC packet payload and parse for the nickname indicator (e.g., "NICK" or "NICK:" to name two non-limiting examples and as discussed earlier relative to Block 606). If the nickname indicator is not present (Decision 812), then the gateway can turn to normal processing of the IRC packet (Block 814). This is unlikely since the given packet is from a server responding to a client request, and therefore the client entry should already have been made. If the nickname indicator is present (Decision 812), then the gateway can extract the nickname and the IRC server IP (Block 816) and update the client nickname in the table (Block 820). This happen when an active client tries to update its nickname and sends a request to the IRC server to use a different nickname. The server, after validating the new nickname, sends a reply to the IRC client through the gateway that use of the new nickname is acceptable. Block 820 updates the table in the gateway as the acceptance is passed from the IRC server to the IRC client or sending client. The algorithm also handles the scenario where after extracting a nickname from the reply from the IRC server, the corresponding sending client entry is not found in the table. While the algorithm handles this situation, its occurrence is unlikely since the given packet is incoming from an IRC server responding to a client request, and therefore the client entry should already exist. One instance where the entry may not exist is where the client disconnects from the IRC server before the reply from the IRC server is received.

Relative to the receipt of an IRC packet (Block 602), an IRC client (e.g., 202, 302) in communication with the gateway can send the IRC packet, and intend the IRC packet to reach another IRC client (e.g., 204, 304). Hence, the IRC packet can be sent by a sender and be destined for a recipient client. Said another way, the sender can be a server and the recipient can be a client, when discussing the two clients in a client-server relationship.

Parsing for a nickname in a packet is particularly challenging since IRC packets do not have a defined structure or length for the payload and subcomponents thereof. Therefore, a parsing algorithm cannot merely assume that a length of portions of the payload is known, as they are in IP and TCP packets. As such, parsing algorithms must go through the payload character-by-character without any expectation as to the limit of the characters that will need to be searched. A nickname indicator is a structure or text block within a payload of the IRC packet that precedes or otherwise indicates that a nickname of a client can be found near this indicator. For instance, the nickname indicator may be the characters "NICK" or these characters in combination with a colon, "NICK:." Such an indicator often precedes a sender nickname, although other arrangements relative to the nickname can also occur and be used to identify a location of the nickname within the IRC packet.

In some embodiments, the termination indicator can be "QUIT" or "QUIT:."

In an embodiment, the communication indicator can take the following string pattern "\1DCC CHAT t AAAAAAAA PPPP\1\n". This is pattern for a message where a client is request direct communication (or DCC) with another client. Here, "AAAAAAAA" represents the IP address of the sender and "PPPP" represents the port of the sender.

Relative to Block 716, in an embodiment, the chat indicator can take the form "PRIVMSG <nickname>," where <nickname> is nickname of receiving client. Where such an indicator exists, the nickname can be extracted in Block 716.

Decisions 718 and 720 look to the nickname and server IP address in the payload. These values may take the form, <nickname, server IP>, and this combination can uniquely define a client since no two clients can have same nickname on the same IRC server.

Relative to Block 802, in an embodiment, the server connection successful indicator can take the form, "MOTD." This pattern may be used in the reply from the IRC server when the IRC server accepts a connection request from a sending client.

In an embodiment, the receiving client IP (or destination IP) and sending client IP (server IP) can be used to determine if the sender and recipient are in the table in Decision 808.

In Block 810, the pattern, "NICK" or "NICK:" may be the nickname indicator, and can be used in a reply from the IRC server to the sending client confirming that the nickname selected by the sending client is valid and that the sending client can continue using this nickname.

The challenges that this disclosure overcomes are further heightened when one understands the diversity of scenarios that these solutions are able to handle. For instance, the following five examples show just some of the scenarios that increase the difficulty of the herein discloses systems, methods, and apparatus. One challenging scenario is a client that is connected to two different IRC servers and uses the same nickname on both IRC servers. While this scenario could pose a problem for those seeking to provide the herein disclosed solutions, the inventors recognized that use of the <nickname, server IP> combination to identify a client in the table avoids conflicts when a client uses the same nickname on two or more IRC servers, since the server IPs will be different, and hence distinction between the client on the two different servers can be made.

Another challenging scenario is when a client changes its nickname after registering with an IRC server. In such a case, the client can send a nickname change request to the IRC server. Since this client is already connected to the IRC server, its new nickname will only take effect when the IRC server agrees to the nickname change. Hence, in this scenario, the client nickname is not updated in the table when the client sends the request. Rather, the update only occurs once the gateway receives confirmation from the IRC server that the change is accepted.

Another challenging scenario occurs where the client attempts to change its nickname before registration with the IRC server. In this case, the sending client is not yet registered with the server, hence whenever the client sends a request to use a nickname, the gateway makes an entry in the table, since if the nickname is accepted, the client will use this nickname. However, the status of the client in the table is marked as inactive until confirmation of the nickname change from the IRC server is received.

Client termination of a connection with the IRC server poses other challenges. In this case, the gateway removes the client entry from the table in order to avoid stale entries.

Yet another challenge arises when a server terminates a connection with the client. As with client termination of the connection, the gateway can remove the client entry from the table to avoid stale entries.

Figure 9:
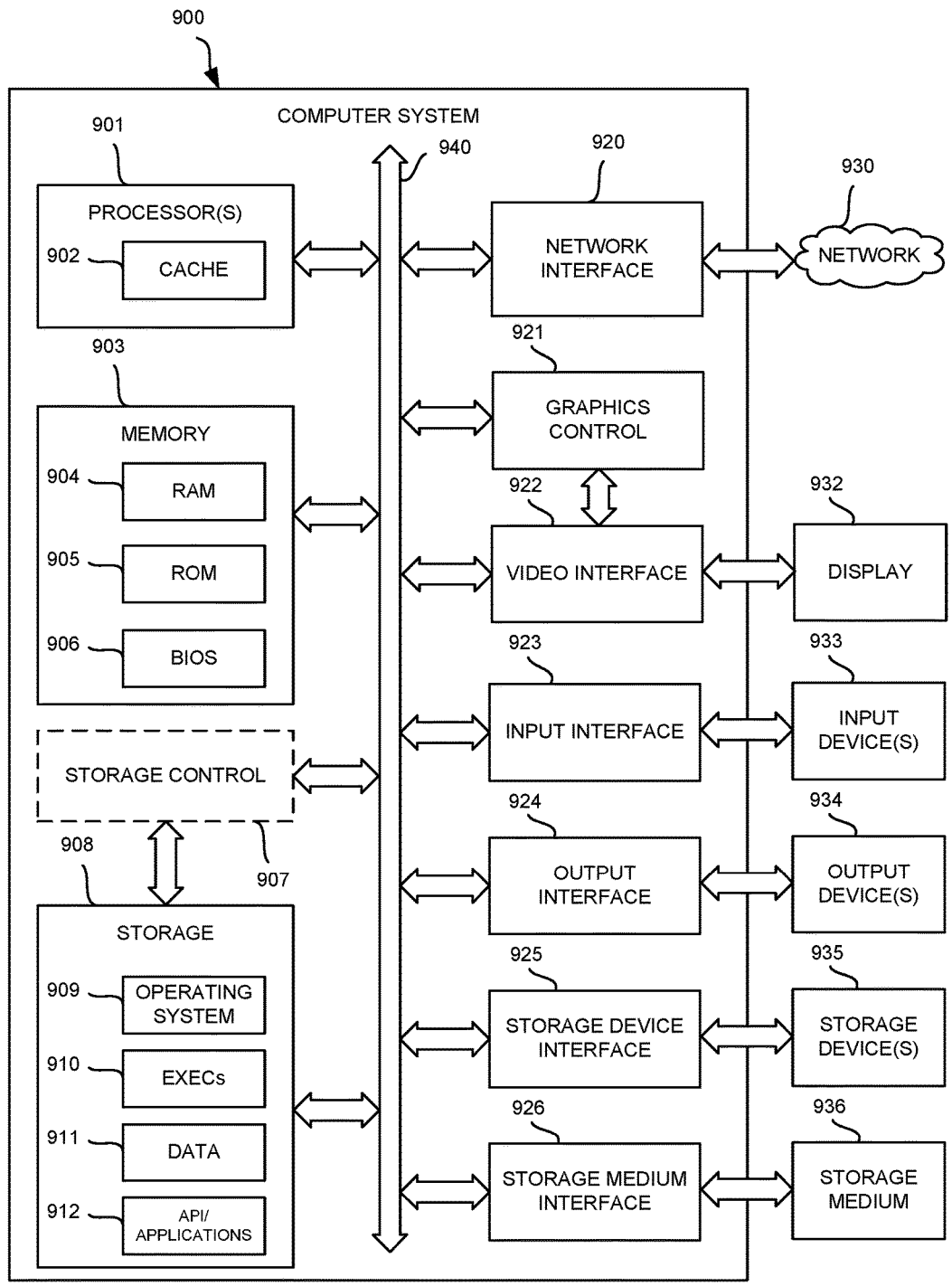
FIG. 9 shows a diagrammatic representation of one embodiment of a computer system.

The systems and methods described herein can be implemented in a computer system in addition to the specific physical devices described herein. FIG. 9 shows a diagrammatic representation of one embodiment of a computer system 900 within which a set of instructions can execute for causing a device to perform or execute any one or more of the aspects and/or methodologies of the present disclosure. Gateways 208 and 308 in FIGS. 2 and 3 are examples of two implementations of the computer system 900. The components in FIG. 9 are examples only and do not limit the scope of use or functionality of any hardware, software, firmware, embedded logic component, or a combination of two or more such components implementing particular embodiments of this disclosure. Some or all of the illustrated components can be part of the computer system 900. For instance, the computer system 900 can be a general purpose computer (e.g., a laptop computer) or an embedded logic device (e.g., an FPGA), to name just two non-limiting examples.

Computer system 900 includes at least a processor 901 such as a central processing unit (CPU) or an FPGA to name two non-limiting examples. The gateways 208 and 308 in FIGS. 2 and 3 can each have one or more processors exemplifying implementations of the processor 901. The computer system 900 may also comprise a memory 903 and a storage 908, both communicating with each other, and with other components, via a bus 940. The bus 940 may also link a display 932, one or more input devices 933 (which may, for example, include a keypad, a keyboard, a mouse, a stylus, etc.), one or more output devices 934, one or more storage devices 935, and various non-transitory, tangible computer-readable storage media 936 with each other and with one or more of the processor 901, the memory 903, and the storage 908. All of these elements may interface directly or via one or more interfaces or adaptors to the bus 940. For instance, the various non-transitory, tangible computer-readable storage media 936 can interface with the bus 940 via storage medium interface 926. Computer system 900 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 901 (or central processing unit(s) (CPU(s))) optionally contains a cache memory unit 902 for temporary local storage of instructions, data, or computer addresses. Processor(s) 901 are configured to assist in execution of computer-readable instructions stored on at least one non-transitory, tangible computer-readable storage medium. Computer system 900 may provide functionality as a result of the processor(s) 901 executing software embodied in one or more non-transitory, tangible computer-readable storage media, such as memory 903, storage 908, storage devices 935, and/or storage medium 936 (e.g., read only memory (ROM)). For instance, the methods 400 and 500 in FIGS. 4 and 5 may be embodied in one or more non-transitory, tangible computer-readable storage media. The non-transitory, tangible computer-readable storage media may store software that implements particular embodiments, such as the methods 400 and 500, and processor(s) 901 may execute the software. Memory 903 may read the software from one or more other non-transitory, tangible computer-readable storage media (such as mass storage device(s) 935, 936) or from one or more other sources through a suitable interface, such as network interface 920. The gateways 208 and 308 can include network interfaces embodying the network interface 920. The software may cause processor(s) 901 to carry out one or more processes or one or more steps of one or more processes described or illustrated herein. Carrying out such processes or steps may include defining data structures stored in memory 903 and modifying the data structures as directed by the software. In some embodiments, an FPGA can store instructions for carrying out functionality as described in this disclosure (e.g., the methods 400 and 500). In other embodiments, firmware includes instructions for carrying out functionality as described in this disclosure (e.g., the methods 400 and 500).

The memory 903 may include various components (e.g., non-transitory, tangible computer-readable storage media) including, but not limited to, a random access memory component (e.g., RAM 904) (e.g., a static RAM "SRAM", a dynamic RAM "DRAM, etc.), a read-only component (e.g., ROM 905), and any combinations thereof. ROM 905 may act to communicate data and instructions unidirectionally to processor(s) 901, and RAM 904 may act to communicate data and instructions bidirectionally with processor(s) 901. ROM 905 and RAM 904 may include any suitable non-transitory, tangible computer-readable storage media described below. In some instances, ROM 905 and RAM 904 include non-transitory, tangible computer-readable storage media for carrying out the methods 400 and 500. In one example, a basic input/output system 906 (BIOS), including basic routines that help to transfer information between elements within computer system 900, such as during start-up, may be stored in the memory 903.

Fixed storage 908 is connected bidirectionally to processor(s) 901, optionally through storage control unit 907. Fixed storage 908 provides additional data storage capacity and may also include any suitable non-transitory, tangible computer-readable media described herein. Fixed storage 908 may be used to store operating system 909, EXECs 910 (executables), data 911, application programming interface (API) applications 912 (application programs), and the like. For instance, the fixed storage 908 could be implemented for storage of client identifiers as described in FIGS. 2 and 3. Often, although not always, fixed storage 908 is a secondary storage medium (such as a hard disk) that is slower than primary storage (e.g., memory 903). Fixed storage 908 can also include an optical disk drive, a solid-state memory device (e.g., flash-based systems), or a combination of any of the above. Information in fixed storage 908 may, in appropriate cases, be incorporated as virtual memory in memory 903.

In one example, storage device(s) 935 may be removably interfaced with computer system 900 (e.g., via an external port connector (not shown)) via a storage device interface 925. Particularly, storage device(s) 935 and an associated machine-readable medium may provide nonvolatile and/or volatile storage of machine-readable instructions, data structures, program modules, and/or other data for the computer system 900. In one example, software may reside, completely or partially, within a machine-readable medium on storage device(s) 935. In another example, software may reside, completely or partially, within processor(s) 901.

Bus 940 connects a wide variety of subsystems. Herein, reference to a bus may encompass one or more digital signal lines serving a common function, where appropriate. Bus 940 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 900 may also include an input device 933. In one example, a user of computer system 900 may enter commands and/or other information into computer system 900 via input device(s) 933. Examples of an input device(s) 933 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 933 may be interfaced to bus 940 via any of a variety of input interfaces 923 (e.g., input interface 923) including, but not limited to, serial, parallel, game port, USB, FIREWIRE, THUNDERBOLT, or any combination of the above.

In particular embodiments, when computer system 900 is connected to network 930 (such as subnets 214 and 314 in FIGS. 2 and 3), computer system 900 may communicate with other devices, such as mobile devices and enterprise systems, connected to network 930. Communications to and from computer system 900 may be sent through network interface 920. For example, network interface 920 may receive incoming communications (such as requests or responses from other devices) in the form of one or more packets (such as Internet Protocol (IP) packets) from network 930, and computer system 900 may store the incoming communications in memory 903 for processing. Computer system 900 may similarly store outgoing communications (such as requests or responses to other devices) in the form of one or more packets in memory 903 and communicated to network 930 from network interface 920. Processor(s) 901 may access these communication packets stored in memory 903 for processing.

Examples of the network interface 920 include, but are not limited to, a network interface card, a modem, and any combination thereof. Examples of a network 930 or network segment 930 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. For instance, the subnets 214 and 314 are exemplary implementation of the network 930. A network, such as network 930, may employ a wired and/or a wireless mode of communication. In general, any network topology may be used.

Information and data can be displayed through a display 932. Examples of a display 932 include, but are not limited to, a liquid crystal display (LCD), an organic liquid crystal display (OLED), a cathode ray tube (CRT), a plasma display, and any combinations thereof. The display 932 can interface to the processor(s) 901, memory 903, and fixed storage 908, as well as other devices, such as input device(s) 933, via the bus 940. The display 932 is linked to the bus 940 via a video interface 922, and transport of data between the display 932 and the bus 940 can be controlled via the graphics control 921.

In addition to a display 932, computer system 900 may include one or more other peripheral output devices 934 including, but not limited to, an audio speaker, a printer, and any combinations thereof. Such peripheral output devices may be connected to the bus 940 via an output interface 924. Examples of an output interface 924 include, but are not limited to, a serial port, a parallel connection, a USB port, a FIREWIRE port, a THUNDERBOLT port, and any combinations thereof.

In addition or as an alternative, computer system 900 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 400 and 500) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A gateway device in communication with first and second internet relay chat (IRC) clients, the first and second IRC client configured to communicate with each other via an IRC server and the gateway, the gateway device comprising:
   a database configured to store nicknames of IRC clients on a subnet with identifiers of IRC servers that are connected to the IRC clients on the subnet;
   a network address translation component;
   an application programming interface configured to control whether the network address translation component performs network address translation (NAT) NAT on IRC client communications that pass through the gateway device; and
   a client matching module having:
      a database update module configured to record IRC client nicknames, IRC client nickname changes, and corresponding IRC server identities to the database;
      a parser configured to parse a direct client-to-client (DCC) request received at the gateway device from the first IRC client, and to form a parsed DCC request;
      an intended recipient identification module in communication with the parser and configured to identify a nickname of an intended recipient client of the request from the parsed DCC request,
      an IRC server identification module in communication with the parser and configured to identify an IRC server identity associated with the first IRC client, and if the IRC server identification module determines that the IRC server identity is that of the IRC server; then
      an IRC client match determination module configured to determine if an entry for an IRC client in the database exists for the nickname and the IRC server identity; and if so,
      a NAT control module in communication with the network address translation component via the application programming interface, the NAT control module configured to disable the network address translation component for the DCC request if the IRC client match determination module informs the NAT control module that an entry for an IRC client in the database exists for the nickname and the IRC server identity.

2. The gateway device of claim 1, wherein the first and second IRC clients are configured to make a transmission control protocol (TCP) connection and communicate directly without the IRC server once the TCP connection is established.

3. The gateway device of claim 2, wherein the two IRC clients communicate via a DCC communication.

4. The gateway device of claim 1, wherein the NAT control module is only configured to disable the network address translation component for the DCC request if the two IRC clients are SoftAP clients.

5. The gateway device of claim 1, wherein each of the two IRC clients is configured to have a transmission control protocol (TCP) server and to communicate via the TCP protocol.

6. A method comprising:
   receiving at a gateway between two clients and an internet relay chat (IRC) server, a request from a first of the two clients for a direct communication with the second client, the request including an identifier of an intended recipient of the request, the two clients both connected to the IRC server through the gateway and both residing on the same subnet, the gateway also including a database of client identifiers for IRC clients on the subnet;
   searching the database for the identifier of the intended recipient of the request;
   determining if the identifier matches an entry in the database; and if so,
   disabling a network address translation component of the gateway for the request; and transferring the request to the IRC server without changing a sender IP address in the request from a private IP address of the first client to a public IP address of the gateway.

7. The method of claim 6, further comprising:
receiving the request from the IRC server; and
transferring the request to the second client; and then making a successful transmission control protocol (TCP) connection between the two clients.

8. The method of claim 7, wherein, after the TCP connection is established, the two clients communicate directly without the IRC server.

9. The method of claim 6, wherein the two clients are SoftAP clients.

10. The method of claim 6, wherein the direct communication between the two clients is a direct client-to-client (DCC) communication.

11. The method of claim 6, further comprising providing a transmission control protocol (TCP) server in each of the two clients, and communicating between the two clients via the TCP protocol.

12. The method of claim 6, wherein each of the identifiers includes a client nickname and an internet relay chat (IRC) server that the client is connected to.

13. The method of claim 6, wherein the transferring takes place without invoking application programming interfaces of a network address translation (NAT) module of the gateway, thereby preventing the changing of the private internet protocol (IP) address of the first client to a public IP address of the gateway.

14. A system comprising:
means for providing a gateway between two clients and an internet relay chat (IRC) server, the two clients being on the same subnet;
means for maintaining a list of client nicknames, respective IRC servers corresponding to the client nicknames, and respective private internet protocol (IP) W addresses corresponding to the client nicknames;
means for receiving a request from a first of the two clients for a direct communication between the two clients, the request received at the gateway;
means for adding a client nickname and identity of the IRC server to the list for the first client in response to receiving the request;
means for changing a private IP address of the first client to a public IP address of the gateway and transferring the request to the IRC server;
means for receiving the request back from the IRC server;
means for checking to see if an IP address for the sender of the request is the public IP address of the gateway, and if so,
means for analyzing the list of client nicknames and their respective IRC servers to determine if a nickname of the first client appears in the list along with the IRC server's identity; and if so,
means for changing the public IP address of the gateway, in the request, back to the private IP address of the first client and transferring the request to the second client.

15. A non-transitory, tangible computer readable storage medium, encoded with processor readable instructions to perform a method for establishing a direct communication between two internet relay chat (IRC) clients without using an IRC server once a connection is established, the method comprising:
receiving at a gateway between two clients and an IRC server, a request from a first of the two clients for a direct communication with a second of the two clients, the request including an identifier of an intended recipient of the request, the two clients both connected to the IRC server through the gateway and both residing on the same subnet, the gateway also including a database of client identifiers for IRC clients on the subnet;
searching the database for the identifier of the intended recipient of the request;
determining if the identifier of the intended recipient matches an entry in the database; and if so,
disabling a network address translation component of the gateway for the request; and
transferring the request to the IRC server without changing a sender internet protocol (IP) address in the request from a private IP address of the first client to a public IP address of the gateway.

16. The non-transitory, tangible computer readable storage medium of claim 15, further comprising:
receiving the request from the IRC server; and
transferring the request to the second client; and then making a successful transmission control protocol (TCP) connection between the two clients.

17. The non-transitory, tangible computer readable storage medium of claim 16, wherein, after the TCP connection is established, the two clients communicate directly without the IRC server.

18. The non-transitory, tangible computer readable storage medium of claim 15, wherein the two clients are SoftAP clients.

19. The non-transitory, tangible computer readable storage medium of claim 15, wherein the direct communication between the two clients is a direct client-to-client (DCC) communication.

20. The non-transitory, tangible computer readable storage medium of claim 15, wherein the identifiers include client nicknames and a respective internet relay chat (IRC) server.

* * * * *